United States Patent [19]

Falk

[11] 4,240,947

[45] Dec. 23, 1980

[54] CROSS-LINKED ELASTOMERIC POLYESTER LATICIES

[75] Inventor: John C. Falk, Chicago, Ill.

[73] Assignee: Borg-Warner Corporation, Chicago, Ill.

[21] Appl. No.: 43,562

[22] Filed: May 29, 1979

[51] Int. Cl.$^3$ .................... C08L 67/02; C08L 67/06; C08G 63/76
[52] U.S. Cl. .................... 260/29.2 E; 260/29.2 UA; 260/29.6 NR; 260/29.6 PM; 528/272; 528/306; 528/499
[58] Field of Search ................ 260/29.2 E, 29.2 UA, 260/29.6 PM, 29.6 WQ; 528/273, 306, 272, 499

[56] References Cited

U.S. PATENT DOCUMENTS

| | | | |
|---|---|---|---|
| 2,448,585 | 9/1948 | Fuller | 260/75 |
| 3,847,855 | 11/1974 | Dawson | 260/29.6 PM |

FOREIGN PATENT DOCUMENTS 48-8871 3/1973 Japan.
48-32771 10/1973 Japan.

*Primary Examiner*—Theodore E. Pertilla
*Attorney, Agent, or Firm*—Richard J. Schlott

[57] ABSTRACT

A process for preparing laticies of cross-linked, elastomeric aliphatic polyesters comprising preparing a solution of the polyester in an organic solvent, emulsifying the polyester solution, stripping out the solvent and cross-linking the resulting polyester latex by heating with a peroxide. Upon coagulation, the cross-linked elastomer is obtained as a free-flowing powder.

3 Claims, No Drawings

CROSS-LINKED ELASTOMERIC POLYESTER LATICIES

BACKGROUND OF THE INVENTION

This invention relates to cross-linked elastomeric polyesters. More particularly, this invention relates to a method for preparing cross-linked elastomeric polyesters in latex form.

Linear, high molecular weight, aliphatic polyesters may be prepared by the polyesterification of aliphatic glycols with saturated dicarboxylic acids, or by the self-condensation of an hydroxy carboxylic acid. When a small portion of the glycol or carboxylic acid monomer contains ethylenic unsaturation, the resulting linear polyester contains a limited amount of ethylenic unsaturation. Polyester gums are generally vulcanizable with peroxides, and can be cured to form tough, oil-resistant elastomers. The including of a limited degree of unsaturation in the polyester serves to improve the rate of cross-linking and to lower the level of peroxide needed to accomplish the curing step. The preparation of polyesters as liquids or gums and subsequent vulcanization with a peroxide to form cured rubber articles or sheet stock is more fully described in U.S. Pat. No. 2,448,585.

The esterification or transesterification processes employed for the preparation of aliphatic polyesters are generally run in bulk or in solvents at elevated temperatures and essentially in the absence of water. The resulting high molecular weight polymer is a heavy liquid or gum which on curing becomes a solid, rubbery mass. Cured elastomeric polyesters have not been obtainable in a finely-divided particulate form such as a free-flowing powder or as a dispersed suspension or latex. Esterification processes do not lend themselves to being carried out in aqueous emulsion, and subjecting a cured rubber to a mastication or grinding process results in a non-uniform mixture of coarse rubber particles, rather than a finely-divided free-flowing powder.

SUMMARY OF THE INVENTION

The present invention provides a process for the preparation of a cross-linked elastomeric polyester in latex form. The resulting polyester latex may be coagulated to provide a powdered cross-linked polyester rubber.

The process of the instant invention comprises the steps of providing a linear, high molecular weight aliphatic polyester rubber optionally containing a limited amount of ethylenic unsaturation, dissolving the polyester rubber in a suitable organic solvent, mixing the polymer solution with water containing a surfactant, passing the mixture through a homogenizer to provide an emulsion, stripping the organic solvent from the emulsion to provide a latex, and heating the latex with a peroxide catalyst to cross-link the latex particles.

DESCRIPTION OF THE PREFERRED EMBODIMENTS

The polyesters suitable for the purposes of this invention are the linear aliphatic polyesters described and set forth in U.S. Pat. No. 2,448,585. In general, the elastomeric polyesters may be described as copolymers of aliphatic dicarboxylic acids and glycols wherein from about 0 to about 20% of the glycol and/or the dicarboxylic acid is ethylenically unsaturated. More particularly, the polyesters will be polymers of $C_2$ to $C_{10}$ alkylene glycols and $C_4$ to $C_{10}$ alkylene dicarboxylic acids wherein from 0 to about 20% of the glycol monomer component and/or the dicarboxylic acid monomer component is, respectively, a $C_4$ to $C_{10}$ dihydroxy alkene or a $C_4$ to $C_{10}$ alkenyl dicarboxylic acid. Examples of suitable alkylene glycols include ethylene glycol, propylene glycol, tetramethylene glycol, pentamethylene glycol, hexamethylene glycol, decamethylene glycol, the position isomers thereof such as isopropylene glycol neopentyl glycol, dimethyl tetramethylene glycol and the like, as well as mixtures thereof. Suitable dihydroxyalkenes include, for example, dihydroxybutene, dihydorxyhexene and the like. The alkylene dicarboxylic acids include, for example, succinic acid, adipic acid, sebacic acid and the like, as well as mixtures thereof. The alkenylene dicarboxylic acids which may be employed for the preparation of unsaturated polyesters include maleic acid, fumeric acid, itaconic acid, citraconic acid and the like. The polyesters may be readily produced by the processes set forth in the cited prior art, and the particular method of their preparation does not form a part of the instant invention.

In preparing a cross-linked polyester latex according to the practice of this invention, the polyester is first dissolved in a suitable organic solvent. To be useful for the purposes of this invention, the organic solvent must be immiscible with water, and be sufficiently volatile to be readily stripped from an aqueous emulsion. Examples of suitable solvents include chloroform, methylene chloride, benzene, toluene and the like.

The solution will contain from about 5 to about 20 wt%, preferably from about 7.5 to about 12.5%, of the polyester. Concentrated solutions of polyesters are generally extremely viscous masses which flow and are dispersed only with great difficulty. The particular concentration to be employed will be chosen to provide a moderately viscous, readily pumpable liquid. Low concentrations, and in particular concentrations below about 5 wt%, are to be avoided in part to reduce the amount of solvent to be stripped from the emulsion in a subsequent step. In practice it has been found that for most combinations of solvents and polyesters a concentration in the preferred range of 7.5 to 12.5 wt% provides a readily dispersable, easily handled liquid.

An emulsion of the polyester is then prepared by mixing the solution of polyester with approximately an equal volume of water containing a surfactant. Any of the variety of commerically available surfactants such as the sodium alkyl aryl sulfonates may be employed to stabilize the emulsion. An amount of from about 0.5 to about 10 wt% based on the weight of polyester to be emulsified is generally sufficient to provide a stable latex. The mixing is carried out under high shear conditions, preferably by passing the mixtue through a homogenizer to completely disperse the organic phase and form an essentially uniform, oil-in-water emulsion.

The solvent will then be stripped from the emulsion by heating the mixture and distilling the solvent. The distillation may be accomplished under vacuum, if desired, to hasten solvent removal, and steam-stripping or sparging may also be preferred. The resulting solvent-free latex comprises finely dispersed, uncross-linked polyester in aqueous emulsion.

Cross-linking of the polyester in latex form is accomplished by adding a suitable peroxide catalyst such as benzoyl peroxide, lauryl peroxide or the like, and heating the mixture to effect decomposition of the peroxide and cross-linking of the polyester. The amount of peroxide will be from about 0.5 to about 5 wt%, based upon the weight of polyester. Although the peroxide may be dispersed into emulsion prior to stripping or into the solvent-free, uncross-linked latex, it is generally more practical to add the peroxide to the solution of the polyester prior to forming the initial emulsion. The solvent-stripping and cross-linking can then be accomplished by heating the emulsion to effect solvent removal, then continuing the heating of the solvent-free latex to complete the cross-linking reaction. The product, a cross-linked polyester latex, may be employed in forming blends with laticies of other polymers, or may be coagulated or precipitated to provide a cross-linked polyester rubber as a finely-divided, free-flowing powder.

EXAMPLE 1. PREPARATION OF THE POLYESTER

A resin flask was charged with 70.1 g (0.48 m) of adipic acid, 4.8 g (0.078 m) of ethylene glycol, 29.5 g (0.39 m) of propylene glycol, 6.4 g (0.072 m) of 1,4 dihydroxybutene-2, and 0.24 g of zinc acetate catalyst. The mixture was heated at 140°–150° C. under nitrogen for approximately five hours. The temperature was then raised to 200°–220° C. over a two hour period, and held at that temperature under a vacuum of 0.5 mm for an additional two hours. The mixture was then cooled to room temperature. The reaction mass was a crummy solid liquid having a nsp/c of 0.61 (25° C.) and a number average molecular weight of 18,5000.

EXAMPLE 2. PREPARATION OF A POLYESTER LATEX

A solution of 20 g of the polyester of Example 1 in 200 ml of methylene chloride was prepared and added to 200 ml of water containing 0.2 g of an alkyl aryl sulfonate surfactant. The mixture was passed twice through a Manton Gaulin homogenizer to produce a stable emulsion. The emulsion was heated with stirring to 90° C. to distill out the methylene chloride, resulting in a stable latex of uncross-linked polyester elastomer.

The latex was coagulated with isopropanol, collected by filtration and dried to give a tacky solid gum. The gum was completely soluble in toluene, indicating that no gel formation has occurred.

EXAMPLE 3. PREPARATION OF A CROSS-LINKED POLYESTER LATEX

A solution of 20 g of the polyester of Example 1 and 0.4 g of benzoyl peroxide in 200 ml of methylene chloride was prepared and emulsified with 200 ml of water containing 0.2 g of an alkyl aryl sulfonate surfactant as in Example 2. The emulsified mixture was heated with stirring to 90° C. to distill out the methylene chloride, then held at 90° C. for about 17 hours to effect coss-linking of the polyester. The product was a stable latex of cross-linked polyester.

The latex was coagulated with isopropanol, collected by filtration and dried to give a free-flowing powder. The powdered cross-linked elastomer had a gel content of 91% as determined by toluene extraction.

EXAMPLE 4. PREPARATION OF A CROSS-LINKED SATURATED POLYESTER LATEX

A saturated polyester was prepared from 0.48 m (97 g) of sebacic acid and 0.44 m (33.5 g) of propylene glycol, using 0.24 g of zinc acetate catalyst and employing the process of Example 1. A solution of 20 g of the polyester and 1.0 g of benzoyl peroxide in 200 ml of methylene chloride was emulsified, solvent stripped and cross-linked by heating at 90° C. for 16 hours, by following the methods of Example 3. The product was a stable latex of cross-linked, saturated polyester.

The cross-linked, saturated polyester was coagulated with isopropanol, collected by filtration and dried to give a free-flowing powder. The powdered cross-linked elastomer had a gel content of 71%, determined by extraction with toluene.

As is apparent from the Examples, stable cross-linked saturated (Example 3) and unsaturated (Example 4) polyester laticies are readily produced by the process of this invention. The coagulation of the cross-linked laticies result in free-flowing powdered elastomers, completely different in physical characteristics from the tack gum elastomers (Example 1). That the powdery nature of the products is not the result of precipitation from a latex is demonstrated by Example 2, in which an uncross-linked latex produces a gummy solid upon coagulation.

The instant invention will thus be seen to be a process for preparing cross-linked polyester laticies and free-flowing powdered polyester elastomers. In view of the well known hydrolytic instability of polyesters, it is surprising and unexpected that the instant process, which includes a step of prolonged heating in aqueous media, does not destroy the polyester elastomers. The product latices are useful in forming blends with latex resins such as SBR laticies and the like. The free-flowing powdered elastomeric polyesters are readily processable in milling and in Banbury equipment, and may be employed in forming blends and alloys by such methods.

It will be apparent to one skilled in the art that a variety of stabilizers, processing acids and the like may be incorporated into the laticies produced by the processes of this invention and that various further modifications may be made without departing from the broad teachings of this invention, the scope of which is defined by the following claims.

I claim:
1. A process for preparing a cross-linked polyester latex consisting of
   A. Preparing a solution comprising from 95 to 80 parts by weight of a water-immiscible organic solvent, from 5 to 20 parts by weight of an aliphatic polyester elastomer and from 0.5 to 5 wt%, based on polyester, of an organic peroxide;
   B. Mixing said solution with an equal volume of water containing from 1 to 10 wt%, based on polyester, of a surfactant;
   C. Passing said mixture through a homogenizer to form an emulsion;
   D. Heating said emulsion to remove said solvent; and
   E. Further heating said emulsion to cross-link said polyester.
2. A cross-linked polyester latex produced by the process consisting of
   A. Preparing a solution comprising from 95 to 80 parts by weight of a water-immiscible organic solvent, from 5 to 20 parts by weight of an aliphatic polyester elastomer and from 0.5 to 5 wt%, based on polyester, of an organic peroxide;
   B. Mixing said solution with an equal volume of water containing from 1 to 10 wt%, based on polyester, of a surfactant;

C. Passing said mixture through a homogenizer to form an emulsion;

D. Heating said emulsion to remove said solvent; and

E. Further heating said emulsion to cross-link said polyester.

3. A powdered, cross-linked polyester produced by the process of

A. Preparing a solution comprising from 95 to 80 parts by weight of a water-immiscible organic solvent, from 5 to 20 parts by weight of an aliphatic polyester elastomer and from 0.5 to 5 wt%, based on polyester, of an organic peroxide;

B. Mixing said solution with an equal volume of water containing from 1 to 10 wt%, based on polyester, of a surfactant;

C. Passing said mixture through a homogenizer to form an emulsion;

D. Heating said emulsion to remove said solvent;

E. Further heating said emulsion to cross-link said polyester; and

F. Coagulating said latex and drying the solid, powdery product.

* * * * *